Oct. 20, 1936.   A. F. VICTOR   2,058,193
TRANSMISSION MECHANISM AND AUTOMATIC THROW-OFF FOR MOTION PICTURE APPARATUS
Filed Aug. 10, 1934   4 Sheets-Sheet 1
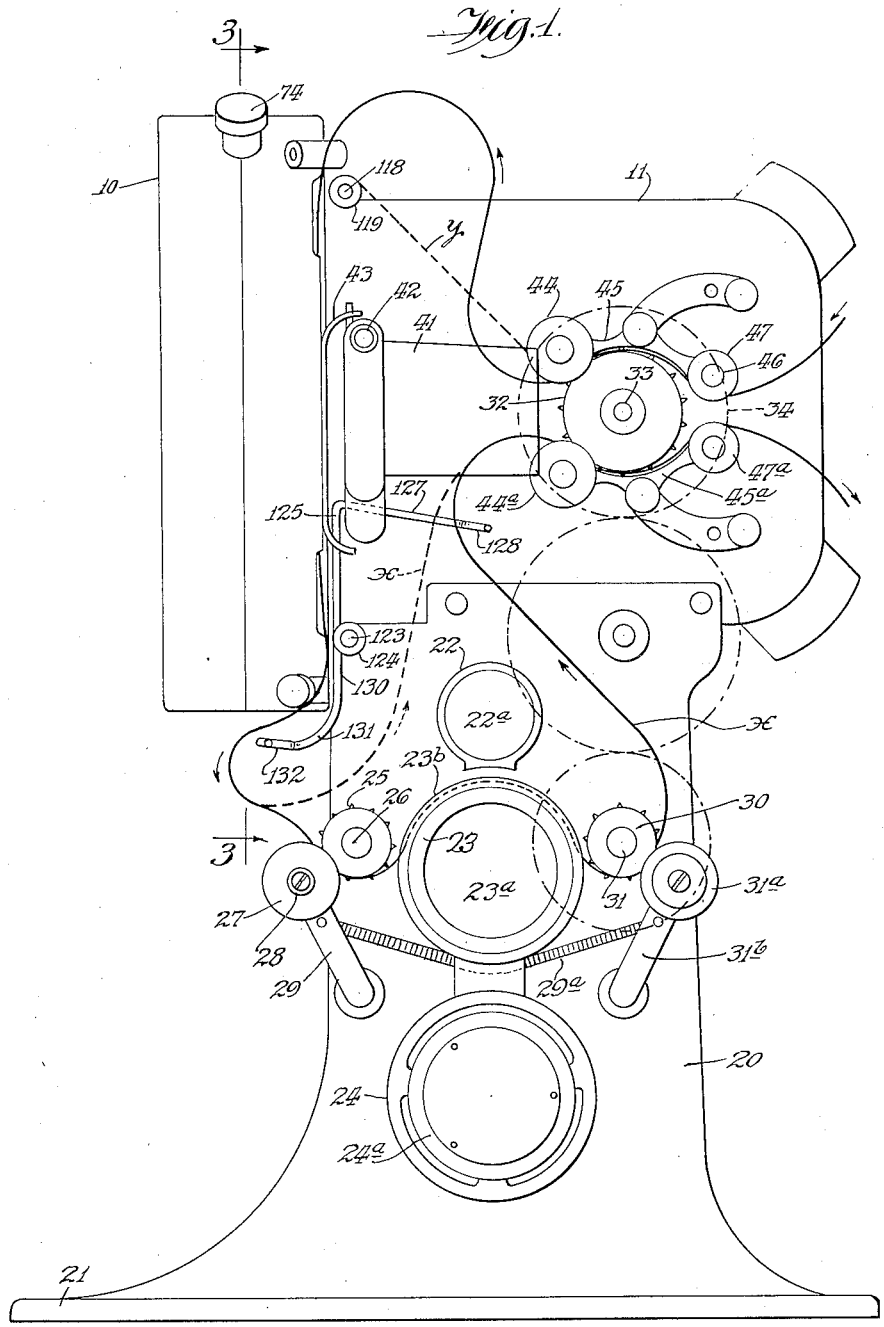

Oct. 20, 1936.  A. F. VICTOR  2,058,193
TRANSMISSION MECHANISM AND AUTOMATIC THROW-OFF FOR MOTION PICTURE APPARATUS
Filed Aug. 10, 1934  4 Sheets-Sheet 2
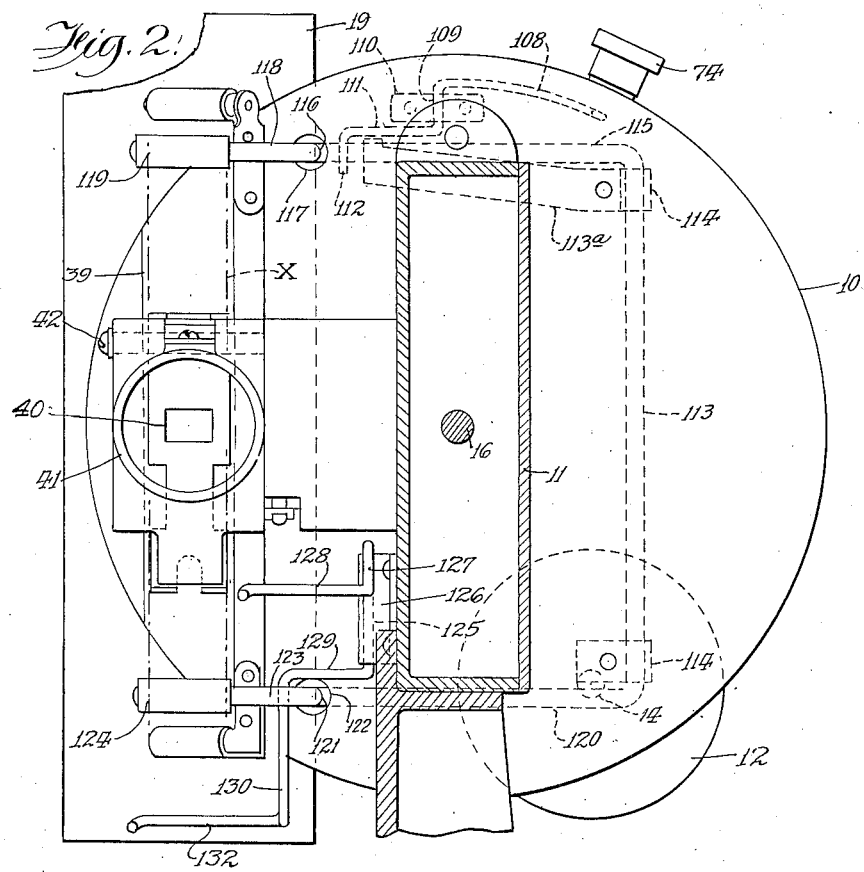
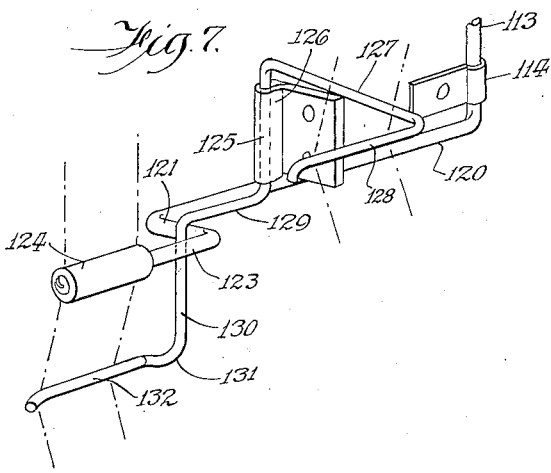

Oct. 20, 1936.  A. F. VICTOR  2,058,193
TRANSMISSION MECHANISM AND AUTOMATIC THROW-OFF FOR MOTION PICTURE APPARATUS
Filed Aug. 10, 1934     4 Sheets-Sheet 4
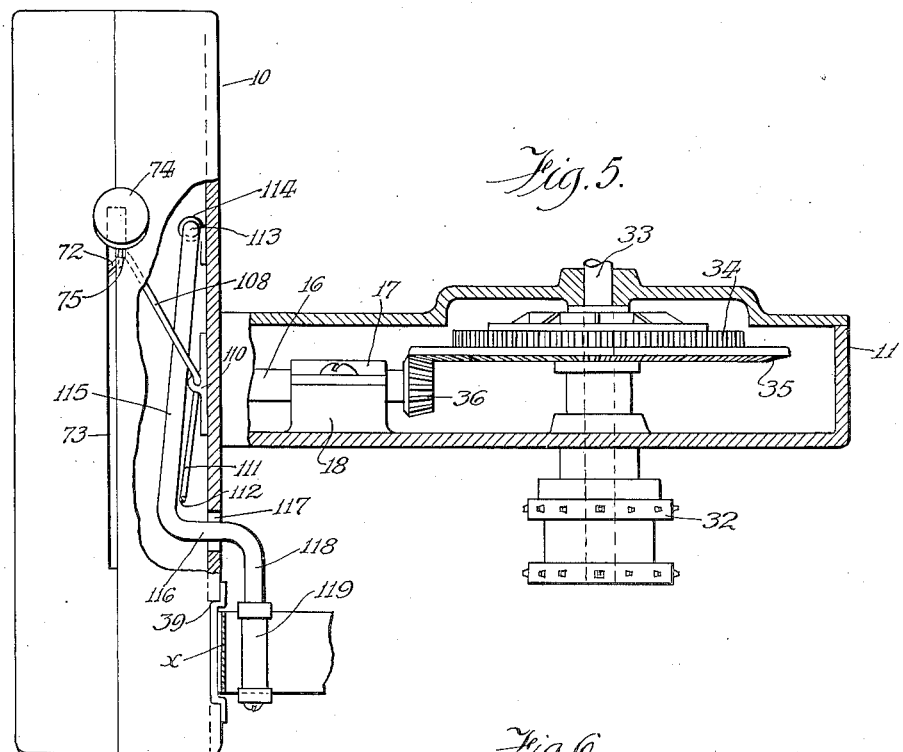
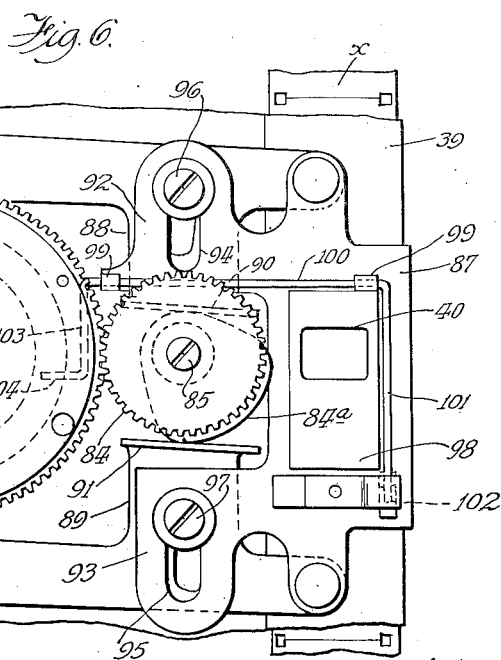
Inventor:
Alexander F. Victor
By E. N. Lundy
Attorney Patented Oct. 20, 1936

2,058,193

UNITED STATES PATENT OFFICE 2,058,193

TRANSMISSION MECHANISM AND AUTOMATIC THROW-OFF FOR MOTION PICTURE APPARATUS

Alexander Ferdinand Victor, New York, N. Y.

Application August 10, 1934, Serial No. 739,329

15 Claims. (Cl. 88—17)

My invention relates generally to motion-picture apparatus of either the silent type or the sound reproduction type. Specifically stated, the improvements consist of means for operatively connecting the film feeding advancing mechanism with suitable driving means, and an automatic clutch or "throw-off" structure that is released through engagement of an element with the film for disconnecting the driving means from the film feeding and other devices including a fire-screen.

In most motion-picture apparatus, the film is advanced to and withdrawn from the intermittent feed devices by means of positively operating continuously rotating sprockets or the like, and it is the practice to provide slack, in the form of loops of film, prior to and after leaving the intermittent feed elements. In the event a loop should accidentally become taut, the resultant pull on the film ribbon is liable to cause damage to the film and may even sever the ribbon.

In the structure which I have herein disclosed the film feed mechanism and other driven structures are connected with the driving mechanism or motor shaft by means which are both automatically and manually controlled. This means may be in the form of separable friction pulleys as herein shown which act in the manner of a clutch. When manually set for the purpose of connecting the motor or drive mechanism with the driven mechanisms, the clutching means are controlled by a system of freely movable levers or arms that have portions disposed in close proximity to the respective slacks or loops of the film so that any accidental straightening or tightening of the slack will move the arms which in turn will act to release the clutching means by separating the friction rollers.

Thereafter, the motor may continue to run, but it will be ineffective to move the film because the mechanism of moving the film will have been instantly disconnected from the driving elements when the clutching elements have been separated.

In addition to the foregoing I have provided an emergency shutter that automatically operates when the clutch means are thrown out so as to be interposed between the lamp and the film to prevent burning or injuring of the latter.

The objects of my invention reside in providing a mechanism of a character described that is simple in construction so that it may be installed upon a small projector for amateur use; it is easy to manipulate; is novel in the arrangement of its parts; and it is dependable in operation. Further objects will be apparent to others, skilled in the art, after my invention is understood. I prefer to practice my invention and to accomplish numerous objects thereof in substantially the manner hereinafter fully described and as more particularly pointed out in the claims, reference being herein made to the accompanying drawings that form a part of this specification.

In the drawings:—

Figure 1 is a vertical elevation of the side of a projector on which the lens and film guide are disposed and showing my improvements installed thereon, a portion of the casing being broken away.

Figure 2 is an elevation looking at the front of the projector towards the film guide and projection lens, parts of the structure being omitted for clearness.

Figure 5 is a view looking down at the top of the apparatus with a portion of the lateral casing wall removed to disclose interior mechanism.

Figure 6 is a vertical elevation of the intermittent feed devices, drawn to an enlarged scale.

Figure 7 is a perspective skeletonized view of the film engaging arms for controlling the throw-off mechanism, the arms being detached.

Figure 3:
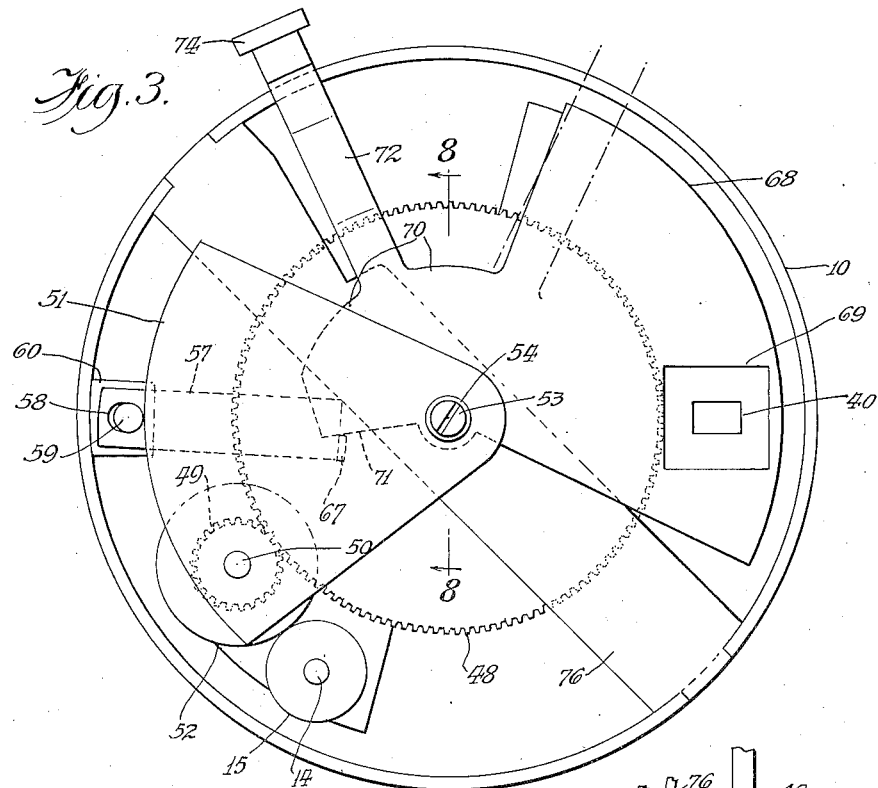
Figure 3 is a vertical section on line 3—3 of Figure 1, looking towards the front in the direction of the arrows, showing the normal operating positions of parts of the throw-off mechanism or clutch.

The drawings it will be understood are more or less schematic for the purpose of illustrating a typical or preferred embodiment of my invention, and in said drawings, the same reference characters have been employed to designate like parts wherever they appear throughout the several views. The apparatus disclosed herein is one that may be used for projecting both silent motion pictures and sound motion pictures, the latter employing what is known as the "sound-on-film" principle.

Referring more particularly to Figures 1 and 2 it will be seen the body portion of the apparatus consists of a circular or cylindrical two-part housing 10 that encloses a portion of the film feeding and control mechanism, and a laterally disposed rectangular shaped housing 11 that extends at a right angle from the front circular wall of housing 10 and encloses another portion of said mechanisms. These combined housings also provide suitable supports and bearings for the various elements and parts of the mechanisms hereinafter described. An electric motor 12 is mounted back of the cylindrical housing 10, and the motor shaft 14 extends inside the cylindrical housing 10 where its end is provided with a friction drive pulley 15. A horizontally disposed shaft 16 is mounted in suitable bearings in housing 10 and projects into the rectangular housing 11 where it has its forward end supported in a bearing 17 on a bracket 18 projecting from the walls of the housing 11.

Back of the cylindrical housing 10 and alongside the motor 12 is the lamp house 19 which provides the illumination for projecting the pictures upon the screen. The housings, including the motor, are supported upon the upper portion of an upright hollow standard 20 having a flat rectangular base 21. Suitable tubular sockets or pockets 22, 23, and 24 are formed in the lower portion of standard 20 and are arranged with their axes horizontal and alined with each other in one vertical plane. These sockets receive respectively the photo-electric cell 22ª, the sound lens 23ª, and the exciter lamp 24ª that comprise the elements which photo-electrically pick up the sound from the sound track on the film and electrically transmit the same to the amplifier, tone-control and other devices usually employed in the reproduction of sound. These elements may be any of the well-known types that are found desirable for the functions performed.

The intermediate element 23ª of the sound group just mentioned protrudes from its socket and has a polished exterior surface and a pair of circumferential flanges 23ᵇ that are spaced apart a distance to provide a depressed guide track in which the film x slides. The film is maintained in the guide track by a toothed roller 25 freely rotatable on a stationary spindle 26 projecting laterally from standard 20, which roller is engaged by a flanged roller 27 rotatably carried on a lateral spindle 28 projecting from the upper free end of an automatically returnable swinging arm 29 that is pivotally mounted at its lower end on the adjacent portion of the standard.

After passing over the guide track on element 23ª the film is engaged with the lower segment of an auxiliary drive sprocket 30 that is fast on a rotatable spindle 31 to move the film upwardly in a slack loop to the main drive sprocket 32. The latter or main sprocket is fast on a rotatable spindle 33 journaled in bearings in the vertical side walls of the lateral rectangular housing 11. The film is retained on sprocket 30 by a flanged roller 31ª carried on a spindle on the upper free end of an automatically returnable swinging arm 31ᵇ that has its lower end pivotally mounted on the standard. A coiled contraction spring 29ª connects the arms 29 and 31ᵇ so that they will automatically return to normal positions whenever they are moved during threading of the film.

The upper sprocket spindle 33 and the lower sprocket spindle 31 are operatively connected by a suitable gear-train, shown dotted in Fig. 1, so that the film is moved at the same speed by the respective sprockets and the loop of film between said sprockets is constantly maintained with the desired amount of slack.

Within the housing 11 the sprocket spindle 33 has the upper gear 34 of the gear-train secured to it and there is also a large beveled gear 35 fast on it alongside gear 34. The adjacent end of the main driven shaft 16 carries a beveled pinion 36 that meshes with and drives the beveled gear 35 whereby the sprockets 30 and 32 are synchronously rotated, the former through the intermediary of the gear-train above mentioned.

The front wall of cylindrical housing 10 is provided with a depressed film guide channel 39 extending vertically across the front wall and spaced from the adjacent or rear portion of the lateral housing 11. At about midway its length the film guide is provided with the rectangular shaped aperture element 40 that frames the pictures in the usual manner, and in front of this aperture element, and axially alined therewith, is the tubular lens-mount 41 that is hinged upon a pivot member 42 so that it may be swung upward to permit placement or removal of the film with respect to the guide. A freely yieldable shoe 43 is supported at the rear end of the lens-mount in a position to enter the film guide and maintain the film ribbon movably therein.

The advancing portion of the film is engaged with the upper segment of the continuously rotating sprocket and is retained thereon by a flanged and grooved roller 44 that is rotatably mounted on a lateral spindle at the adjacent end of a hinged arm 45 having its other end movably mounted on a pintle 46. There is also a guide roller 47 on the pintle so that the film may pass under it in its advancing movement from the supply reel (not shown) to the sprocket 32. As shown in Fig. 1, the film is looped upwardly to provide slack between the sprocket 32 and the place where the film enters the upper portion of the film guide to be engaged by the intermittent feed devices.

After the film has passed out of the film guide it is formed into a shallow lateral loop before it passes between the plain and flanged rollers 25 and 27. Another slack portion or loop is provided between the sprockets 30 and 32. When silent pictures are projected, the film need not be engaged with rollers 25 and 27 and the succeeding elements as hereinbefore described, but may pass upwardly, as indicated by the dot-dash line, to the upper sprocket 32 after forming the lateral loop below the guide channel. A flanged retainer roller 44ª and idle roller 47ª on a swinging arm 45ª maintain the film on the under segment of sprocket 32.

Within the cylindrical housing 10 the main driven shaft 16 has a large gear 48 secured on it that derives motion from a pinion 49 rotatably mounted on a short spindle 50 at the lower corner of the face of a triangular shaped plate 51. There is a friction pulley 52 fastened to the pinion 49 so that it rotates therewith, and the edge of said pulley engages the edge of friction drive pulley 15 when the apparatus is on operation and moving the film. It is the separation of these pulleys that acts as the safety throw-off to automatically disconnect the motor from the film actuating mechanism and other devices while the motor is running. It will be understood a suitable clutch device may be employed in lieu of the structure herein disclosed, since the latter acts in the same manner as a clutch. This is primarily accomplished by moving roller 52 away from the motor shaft roller 15 as shown in Fig. 4.

Figure 4:
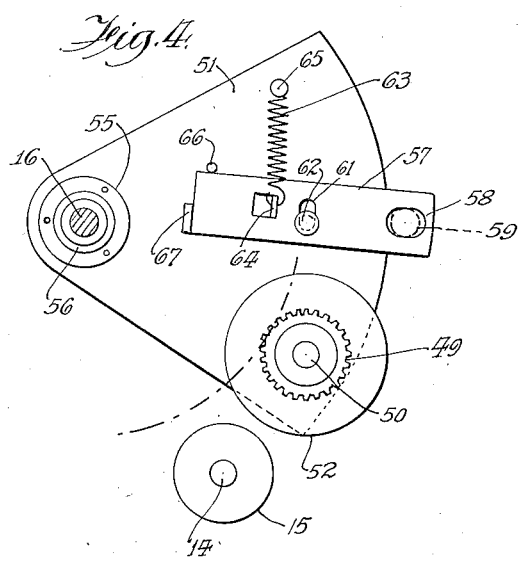
Figure 4 is a vertical fragmentary view of a portion of the throw-off mechanism, looking at the carrier plate from the side opposite that shown in Fig. 3.

By reference to Figs. 3 and 4 it will be seen that one of the edges of this triangular plate is segmental shaped, the curvature of which corresponds with and is concentric to the adjacent cylindrical wall of housing 10, while the other edges of plate 51 converge towards each other and terminate in a rounded apex that points in a horizontal direction beyond the adjacent end of shaft 16.

Figure 8:
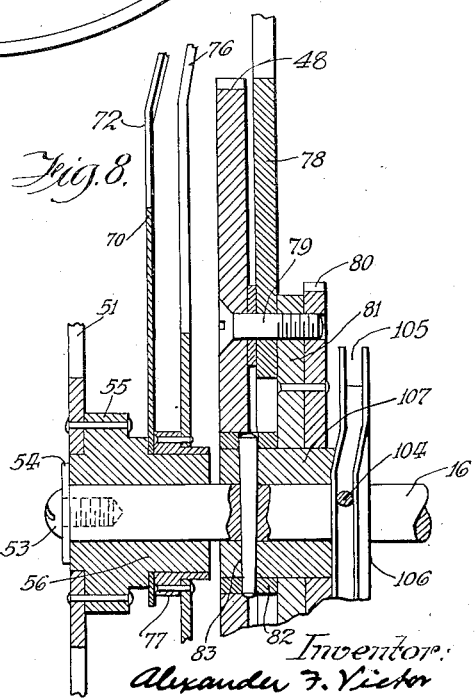
Figure 8 is a fragmentary section taken on line 8—8 of Figure 3, looking in the direction of the arrows.

A round aperture is made in the apex portion of the plate 51 surrounding the shaft 16, which latter is bored and threaded so that a bolt 53 may be screwed therein until its head engages a retainer washer 54 so that the plate is supported by and retained on the shaft but does not rotate therewith. The front side of the plate 51 has the flange 55 of a shouldered bushing 56 riveted or otherwise secured to it, the bore of said bushing being of a diameter that readily accommodates the shaft 16 which it surrounds, and a portion of the bushing enters the round aperture in the carrier plate in the manner shown in Fig. 8.

An automatically returnable rock-lever 57, which is preferably an elongated metal strip, is mounted on the same face of the carrier plate with the pinion 49 and roller 52, and one end of the rock-lever protrudes beyond the segmental edge of the plate where it is provided with a slightly elongated aperture 58 that engages a stud 59 on a bracket 60 projecting from the cylindrical wall of housing 10. The rock-lever has a transverse slot 61 about midway its length that engages with the shank of a headed pin 62 projecting from the carrier plate 51, and a coiled contraction spring 63 has one end connected to an up-struck lug 64 on said rock-lever, while the opposite end of this spring is secured to a pin 65 on the carrier plate.

A stop 66 on the carrier plate limits upward movement of the inner end portion of the rock-lever and there is a lateral flange 67 at the end of the lever adjacent said stop.

The construction of the rock-lever and its arrangement upon the carrier plate is such that when downward pressure is exerted upon the end flange 67 the lever will pivot upon stud 59 and the headed pin 62 will permit such movement until said pin is engaged with the upper end of the transverse slot 61. Thereafter, further downward pressure will cause the carrier plate to pivot at its apex with the shaft 16 as its axis and swing down until the friction pulley 52 has firmly engaged the friction pulley 15 on the motor shaft. The motor should be rotating the pulley 15 at this time and it then begins to drive the film feeding and other devices that have heretofore been inert. In order to separate the rollers 52 and 15 all that it is necessary to do is to release the downward pressure and the spring 63 will then be able to pull upwardly on the rock-lever thereby returning the carrier plate 51 to its uppermost position. This constitutes the throw-off of the mechanism, the action of which is similar to the release of a clutch.

In order to operatively "set" the structure:—that is, to move the rock-lever and carrier plate downwardly, I have provided a manually movable, automatically returnable element of somewhat irregular shape. This element is a metal plate that is mounted on the bushing 56 against a shoulder thereof and is free to swing thereon whenever desired.

The major portion 68 of the plate constitutes a safety element known as a fire-screen which becomes interposed between the lamp and the film when the movement of the latter is stopped. This major portion or fire-screen 68 is of segmental shape as shown in Figure 3 and is provided with a window 69 near its lower corner that is larger than the projection aperture 40 with which it alines during projection of the film pictures. The remaining portion of the plate is in the form of a smaller segmental extension 70 of less diameter than the fire-screen, the two portions 68 and 70 being substantially quadrants in outline, and the smaller quadrant or extension 70 having a straight radial edge 71 that is adapted to engage with the later flange 67 on the rock-lever.

An operating arm 72 projects radially from the quadrant extension 70 and passes out through an elongated narrow slot 73 in the cylindrical wall of housing 10 where it is provided with a head or finger-grasp 74. At the end of the slot there is a recess or notch 75 (Fig. 5) to receive the arm and intermediate its ends the arm is bent or deflected in order to insure its seating in the recess 75.

I have provided a bowed bridge-bar 76 that has lugs at its ends to fit into notches in the housing wall, and at its center of length said bar is provided with an aperture that has a shouldered sleeve 77 riveted to it to fit over the adjacent portion of the bushing 56 on the carrier plate.

The end portions of the bridge bar are deflected slightly (Fig. 8) so that its central portion may be urged in a direction towards the adjacent end of the shaft 16 in order to maintain the plate comprising the fire-screen, etc., on the bushing 56 as well as to urge the latter towards the retaining washer 54.

It will be seen, the carrier-plate 51 and the fire-screen are capable of rotative reciprocatory movement independently of each other as well as each independently of the shaft 16, and that the latter may rotate without moving the first-named parts which are supported thereon. The projection shutter 78 for intermittently displaying the successive frames or pictures of the film is fastened to one of the faces of the gear 48 by means of screws 79 that pass through these elements and into a cam drive pinion 80. A radial flange 81 on a sleeve 82 is interposed between the shutter 78 and gear 80 to separate them a slight distance apart. The sleeve extends centrally through the shutter 78 and the gear 48 on the opposite side of the latter and said sleeve is anchored to the shaft 16 by a transverse pin 83.

The mechanism for intermittently moving the film past the aperture 40 may be any of the desirable or well-known types, such for example as that shown in detail in Figure 6 of the drawings. This mechanism consists of a pinion 84 mounted on the smooth shank of a screw stud 85 and in mesh with the gear 80 so that it is driven thereby.

A triangular shaped cam 84$^a$ is eccentrically mounted fast on the hub of pinion 84, which cam is adapted, by its rotation, to oscillate a shuttle-plate 87 in a vertically reciprocal direction. The shuttle-plate is pivotally connected to the ends of a horizontally arranged pair of vertically oscillatory parallel arms 86 and 86$^a$ which are, adjacent their connections with the shuttle-plate, provided with lateral lugs 88 and 89 respectively projecting towards each other and having outwardly extended lateral flanges or shoulders 90 and 91 that are engaged by the edge of the cam 84$^a$. The opposite ends of the arms 86 and 86$^a$ are movably mounted upon pivots $a$ and $b$ respectively that are carried by the front wall of the cylindrical housing.

The shuttle-plate has upper and lower lateral extensions 92 and 93 that are provided with vertical guide-slots 94 and 95 to cooperate with headed studs 96 and 97 whereby the shuttle-plate is guided in vertical reciprocatory movement immediately back of the projection aperture 40. There is a window 98 of suitable dimensions in the shuttle-plate to prevent obstruction of light rays, during movement of said plate. Pivotally mounted in knuckles 99 on the shuttle-plate and the upper extension 92 is an inverted U-shaped wire 100, the lower end of arm 101 of which is bent laterally to provide a finger or claw 102 that is adapted to successively enter the film perforations through slots in the shuttle plate and the housing wall whereby to intermittently move the film down in the film-guide channel 39 past the light aperture.

The claw is withdrawn from the film during the upward movement of the shuttle-plate while the film is momentarily at rest during projection of a picture frame, and in order to do this I have provided the other arm 103 of the wire with a lateral finger 104 that extends behind pinion 80 to enter an irregular cam groove 105 in the periphery of a circular cam-disk 106 mounted axially on and rotatable with shaft 16. It may be here mentioned the hub 107 of this cam disk extends through pinion 80 and into the sleeve 82 between the latter and the shaft 16 and is anchored in position by the pin 83. During rotation of the cam-disk the irregular formation of its cam-groove changes the relative position of the finger 104 to rock the arm 101 back and forth and insert or withdraw the claw 102 with respect to the film perforations, as the case may be.

In order to throw-off or disconnect the film feed and other driven mechanisms from the motor at any time (or during an emergency) while the mechanisms are being actuated by the motor, I have provided a trigger that is adapted to dislodge the arm 72 from the notch or recess 75 and allow it to automatically return to the opposite end of the slot 73, thus permitting the edge 71 of the fire-screen to release the carrier plate which will return to the position shown in Figure 4.

The trigger just mentioned consists of a length of wire bent zig-zag or Z-shape, which provides an arm 108 that has its free end disposed close to or against the arm 72 when the latter is in the notch 75. The intermediate or central portion 109 of the wire is transversely disposed with respect to the portions of the wire on each side of it and provides the hinge or pivot of the trigger and is movably mounted in a retainer 110 secured to the adjacent wall of the cylindrical housing 10. The other arm 111 of the trigger projects from the pivot portion 109 in a direction opposite to the arm 108 and has a lateral downwardly extending end 112 to be engaged and moved by an element of the devices which operates the trigger to push the arm 72 out of the notch. The oppositely extended arms of the trigger, as seen in Fig. 5 are disposed oblique to each other with their axes intersecting at the transverse axis of the pivot portion 109.

The trigger is coordinated with a structure having members that are positioned in the film loops so that they become engaged and moved by the film whenever the slack in a loop becomes taut. For this purpose I provide a U-shaped rocking frame which is preferably made of heavy wire, the connecting member 113 of which is vertically disposed and is swingingly mounted in upper and lower knuckles 114 secured to the inner surface of the front wall of the housing 10. The upper swinging arm 115 of this frame extends horizontally past the lateral member 112 of the trigger, preferably in contact therewith, and it has a horizontally off-set portion 116 that passes through a hole 117 in the adjacent housing wall, and then extends across the front of the film guide in the form of trip-arm or extension 118.

A roller 119 may be mounted upon the trip-arm 118 where it may be engaged by the film, to reduce the friction, and it will be seen that the position of this trip-arm is within the loop of the film between the sprocket 32 and the film guide channel. A light spring 113ª mounted on the housing wall has its free end engaged with an intermediate portion of the arm 115 to yieldably urge it away from said wall.

The lower arm 120 of the rocking frame extends along the inside of the housing wall parallel to the upper arm, and is provided with a similar off-set portion 121 that passes through an opening 122 in the lower part of the wall, and the extended portion or trip-arm 123 projects past the film guide 39 and is provided with a friction roller 124, all substantially the same as the upper arm. This lower trip-arm 123 and its roller are within a loop of film below the film guide when the film is threaded for silent pictures as shown in dot-dash lines, Fig. 1.

When the film loop, either above or below the guide, becomes taut as suggested in heavy broken lines y in Fig. 1, the film will pull the trip arm 118 outwardly away from the guide. This movement rocks the U-shaped frame composed of the members 113, 115 anld 120, and causes the upper arm 115 thereof to swing the lateral member 112 of the trigger device backwardly, thus rocking the trigger device and causing the arm 108 thereof to push the lever 74 out of the notch 75 and it will move to the other end of the slot 73. Thus the pressure on the rock-lever 57 is released and the carrier plate will move up to separate roller 52 from the motor roller 15.

The motor will continue to drive its roller 15, but the latter having been disconnected from roller 52, the motion of the roller 15 is not transmitted to any of the film moving mechanisms, either the intermittent feed or the sprocket feed. Simultaneous with this action the fire-screen 68, which is a part of the arm 72, will have moved to a position where the light is cut off from the film which is at rest in front of the aperture 40.

Other trip devices are also provided and these are arranged in cooperation with the structure above described but are mounted on the exterior of the housing as seen in Fig. 2 and are formed from a piece of wire, preferably of smaller gauge than the wire of the U-shaped frame, and bent in irregular shape. An intermediate portion 125 of this wire which is straight is positioned vertically at the front of the housing wall and rotatably mounted in a knuckle 126 in order to permit the lateral portions to swing in a hinging manner. An upper swinging arm 127 projects forwardly out from the part 125 and at its outer end is bent laterally and horizontally to provide a trip-finger 128 that extends in front of the film at the upper portion of the slack or loop that is just below the upper sprocket.

From the lower end of the part 125 the wire extends, from a bend, horizontally substantially parallel with the swinging arm 120 to a point beyond the latter's off-set 121, to provide a reach 129. A downward bend in the small wire provides a depending extension 130 that passes downward in the re-entrant angle formed by offset 121 and trip arm 123.

The lower portion of the part 130 is segmentally shaped by providing it with a rearward downward curve 131 and at the end of the latter the wire is bent laterally and horizontally outward to form a trip finger 132 that is positioned close to the film in the shallow horizontal loop formed between the film guide and the rollers 25 and 27. The film enters between these rollers at a point that is immediately below and in substantially the vertical plane of the film guide 39 and said trip finger 132 is off-set with respect thereto.

In the event either of the loops under the control of the respective trip fingers 128 and 132 becomes taut the wire structure will swing causing the depending extension 130 to engage the associated trip-arm 123 and move it together with its U-shaped structure and dislodge the control arm 72 from its notch to stop the feed and interpose the fire-screen 68 between the lamp and the film.

What I claim is:—

1. Motion picture apparatus comprising means for moving the film, a rotatable driven shaft operatively connected with and actuating said means, a rotatable drive pulley, and mechanism operatively connecting said driven shaft and drive pulley consisting of a carrier swingingly mounted on said driven shaft, a driven pulley on said carrier and engageable with the drive pulley, motion transmitting means connecting said driven pulley and said shaft, a rock-lever supported on said carrier and having a fulcrum independent of said carrier, and means for moving said rock-lever whereby to swing said carrier and separate said drive pulley and driven pulley.

2. Motion picture apparatus comprising means for moving the film, a rotatable driven shaft operatively connected with and actuating said means, a rotatable drive pulley, and mechanism operatively connecting said driven shaft and drive pulley consisting of a pivoted carrier fulcrumed on said shaft, a driven pulley on said carrier deriving motion from said drive pulley, gears connecting said shaft and driven pulley, and means for moving said carrier to separate said pulleys whereby to stop rotation of said shaft.

3. Motion picture apparatus comprising means for moving the film, a rotatable driven shaft operatively connected with and actuating said means, a rotatable drive pulley, a swinging carrier mounted on a fixed pivot, a driven pulley on said carrier engagable with said drive pulley, motion transmitting means connecting said driven pulley and shaft, an automatically returnable rock-lever supported on said carrier and fulcrumed independent thereof, a vibratory arm having operative connection with the carrier and adapted to be shifted to a definite position to move the rock-lever and swing said carrier whereby the pulleys are frictionally engaged, a seat in which said arm rests in such shifted position, a trigger for dislodging the arm from said seat to permit a reverse swing of the carrier and disengagement of said pulleys, and a tripping device for operating said trigger and adapted to be operated by engagement with the film.

4. Motion picture apparatus comprising means for moving the film, a rotatable driven shaft operatively connected with and actuating said means, a rotatable drive pulley, a pivoted carrier fulcrumed on said shaft, a driven pulley on said carrier engageable with said drive pulley, a pinion connected to and rotatable with said driven pulley, a gear secured to said shaft in mesh with said pinion, an automatically returnable rock-lever supported on said carrier and fulcrumed independent thereof, a vibratory arm having operative connection with the carrier and adapted to be shifted to a definite position to move the rock-lever and swing said carrier whereby the pulleys are frictionally engaged, a seat in which said arm rests in such shifted position, a trigger for dislodging the arm from said seat to permit a reverse swing of the carrier and disengagement of said pulleys, and a tripping device for operating said trigger and adapted to be operated by engagement with the film.

5. Motion picture apparatus comprising means for moving the film, a rotatable driven shaft operatively connected with and actuating said means, a rotatable drive pulley, a rotatable driven pulley, gears operatively connecting said driven pulley and shaft, a rocking member on which said driven pulley is mounted, an automatically returnable arm having operative connection with said member and adapted to be manually moved in one direction to rock said member whereby said pulleys are operatively engaged, a seat for retaining said arm at the end of its manual movement, a trigger for unseating said arm and adapted to rock said member in another direction whereby said pulleys are disengaged, and a device for tripping said trigger, which device is adapted to be operated by engagement with the film.

6. Motion picture apparatus comprising means for moving the film, a rotatable driven shaft operatively connected with and actuating said means, a rotatable drive pulley, a rotatable driven pulley, gears operatively connecting said driven pulley and shaft, a rocking member fulcrumed on said shaft and on which said driven pulley is mounted, an automatically returnable arm fulcrumed on said shaft and having operative connection with said member and adapted to be manually moved in one direction to rock said member whereby said pulleys are operatively engaged, a fire-screen connected to and actuated by said arm, a seat for retaining said arm at the end of its manual movement, a trigger for unseating said arm and adapted to rock said member in another direction whereby said pulleys are disengaged, and a device for tripping said trigger, which device is adapted to be operated by engagement with the film.

7. Motion picture apparatus comprising means for intermittently moving the film past an aperture, means for advancing the film to and withdrawing it from the first-mentioned means, there being slack loops in the film between said means, a driven shaft having operative connection with each of said means, a rotatable drive pulley, a shiftable driven pulley adapted to be frictionally engaged with and disengaged from said drive pulley, a vibratory carrier on which said driven pulley is mounted, an arm having operative connection with said carrier for manually shifting said carrier to a position to cause engagement of said pulleys, means for holding said arm in the aforesaid position during operation of the film moving structure, and a throw-off structure for releasing said arm to permit return of said carrier, said throw-off structure having portions disposed in the film loops and moved by the film upon the tightening of the slack.

8. Motion picture apparatus comprising means for intermittently moving the film past an aperture, means for advancing the film to and withdrawing it from the first-mentioned means, there being slack loops in the film between said means, a driven shaft having operative connection with each of said means, a rotatable drive pulley, a shiftable driven pulley adapted to be frictionally engaged with and disengaged from said drive pulley, an automatically returnable vibratory carrier fulcrumed on said shaft and on which said driven pulley is mounted, an arm fulcrumed on said shaft having operative connection with said carrier for manually shifting said carrier to a position to cause engagement of said pulleys, means for holding said arm in the aforesaid position during operation of the film moving structure, and a throw-off structure for releasing said arm, said throw-off structure having portions disposed in the film loops and moved by the film upon the tightening of the slack.

9. Motion picture apparatus comprising means for intermittently moving the film past an aperture, means for advancing the film to and withdrawing it from the first-mentioned means, there being slack loops in the film between said means, a driven shaft having operative connection with each of said means, a rotatable drive pulley, a shiftable driven pulley adapted to be frictionally engaged with and disengaged from said drive pulley, a vibratory carrier on which said driven pulley is mounted, an arm having operative connection with said carrier for manually shifting said carrier to a position to cause engagement of said pulleys, means for holding said arm in the aforesaid position during operation of the film moving structure, a throw-off structure for releasing said arm, said throw-off structure having portions disposed in certain of the film loops and moved by the film upon the tightening of the slack, and a supplementary device adapted to engage said throw-off structure and having portions disposed in other film loops.

10. Motion picture apparatus comprising intermittent film feeding means, means for advancing the film to and withdrawing it from said first-mentioned means, there being a plurality of slack loops in the film between said means, transmission mechanism operatively connected to said means, a motor, actuating devices operatively connecting said motor to said transmission mechanism and including separable rollers, a pivoted swinging member that is latched in one position for maintaining said separable members engaged, and a U-shaped rock-frame operably connected with and adapted to release said member from latched position, portions of the arms of which frame are disposed in the respective film loops whereby said rock-frame is moved upon the tightening of the slack in the loops to release said swinging member.

11. Motion picture apparatus comprising intermittent film feeding means, a sprocket for advancing the film to and withdrawing it from said means, there being separate slack loops in advancing and withdrawing portions of the film, transmission mechanism operatively connected to said means and said sprocket, a motor, actuating devices operatively connecting said motor to said transmission mechanism and including separable rollers, a latched swinging member for maintaining said separable members engaged, a U-shaped rock-frame operably connected with and adapted to release said swinging member from latched position, portions of the arms of which frame are disposed in certain of the film loops whereby the rock-frame is moved upon the tightening of the slack in the respective loops, and a supplementary rock-frame having arms disposed in other film loops whereby to be moved upon the tightening of the slack in the last-named loops, said supplementary rock-frame having operative connection with the U-shaped rock-frame for supplementary operation of the latter frame.

12. Motion picture apparatus comprising mechanism for feeding film past a light aperture, means for advancing the film to and withdrawing it from said feed mechanism, drive mechanism, driven mechanism actuated thereby and coacting with the feed mechanism, separable pulleys operatively connecting said drive and driven mechanisms, yielding means tending to separate said pulleys, a latch device having operative connection with said yielding means for maintaining said pulleys normally against separation, and a control element for releasing said latch device, said element adapted to be engaged by the film upon tightening the latter and thereby permit separation of said pulleys by said yielding means.

13. Motion picture apparatus comprising mechanism for feeding film past a light aperture, means for advancing the film to and withdrawing it from said feed mechanism with a loop formed in the film, drive mechanism, driven mechanism actuated thereby and coacting with said feed mechanism, separable pulleys operatively connecting said drive and driven mechanisms, yielding means tending to separate said pulleys, a latch device having operative connection with said yielding means for maintaining said pulleys normally against separation, and a control element for releasing said latch device having a portion extending into the film loop that is adapted to be operated by engagement with the film when the loop is tightened.

14. Motion picture apparatus comprising mechanism for feeding film past a light aperture, a common sprocket engaged for advancing the film to and withdrawing it from said feed mechanism, drive mechanism, driven mechanism actuated thereby and coacting with the feed mechanism, separable pulleys operatively connecting said drive and driven mechanisms, yielding means tending to separate said pulleys, a latch device having operative connection with said yielding means for maintaining said pulleys normally against separation, and a control element for releasing said latch device, said element adapted to be engaged by the film upon tightening the latter and thereby permit separation of said pulleys by said yielding means.

15. Motion picture apparatus comprising mechanism for feeding film past a light aperture, a common sprocket engaged with different portions of the film for advancing the film to and withdrawing it from said feed mechanism with a loop formed in the film, drive mechanism, driven mechanism actuated thereby and coacting with said feed mechanism, separable pulleys operatively connecting said drive and driven mechanisms, yielding means tending to separate said pulleys, a latch device having operative connection with said yielding means for maintaining said pulleys normally against separation, and a control element for releasing said latch device having a portion extending into the film loop that is adapted to be operated by engagement with the film when the loop is tightened.

ALEXANDER FERDINAND VICTOR.